United States Patent [19]

Rees et al.

[11] 4,329,045
[45] May 11, 1982

[54] ILLUMINATION SYSTEM FOR MICROFILM PRINTER

[75] Inventors: James D. Rees, Pittsford; George R. Simpson, Rochester; David C. Bliek, Webster, all of N.Y.

[73] Assignee: Xerox Corporation, Stamford, Conn.

[21] Appl. No.: 138,767

[22] Filed: Apr. 9, 1980

[51] Int. Cl.³ .............................................. G03B 27/54
[52] U.S. Cl. .................... 355/67; 353/27 R; 355/54
[58] Field of Search .................... 355/53, 54, 67, 71, 355/41, 70, 77, 78, 62; 353/27 R, 78, 98; 350/96.25; 49/216

[56] References Cited

U.S. PATENT DOCUMENTS

| 3,498,715 | 3/1970 | Gold | 355/70 |
|---|---|---|---|
| 3,510,221 | 5/1970 | Berman | 355/77 |
| 3,521,949 | 7/1970 | Karow et al. | 353/78 |
| 3,529,129 | 9/1970 | Rees | 219/216 |
| 3,697,177 | 10/1972 | Booth | 355/67 |
| 3,704,946 | 12/1972 | Brault et al. | 355/53 X |
| 3,814,514 | 6/1974 | Douglas et al. | 353/78 |
| 3,848,982 | 11/1974 | Shoji et al. | 353/27 |
| 3,884,570 | 5/1975 | Waly | 353/98 |
| 3,890,043 | 6/1975 | Pramstraller | 355/62 |
| 3,988,064 | 10/1976 | Sone et al. | 355/41 |
| 4,023,903 | 5/1977 | Scheib | 355/71 |
| 4,077,707 | 3/1978 | Waly | 353/27 R |
| 4,113,348 | 9/1978 | Yevick | 350/96.25 |
| 4,140,376 | 2/1979 | Hall | 353/27 R |
| 4,226,522 | 10/1980 | Marshall | 355/67 X |
| 4,226,523 | 10/1980 | Ovshinsky et al. | 355/67 X |

FOREIGN PATENT DOCUMENTS

| 16555 | 10/1980 | European Pat. Off. |
| 497560 | 5/1930 | Fed. Rep. of Germany |
| 2555695 | 12/1975 | Fed. Rep. of Germany |
| 2847187 | 10/1978 | Fed. Rep. of Germany |

OTHER PUBLICATIONS

"Lenses in Photography," Rudolf Kingslake (Case-Hoyt), 1951, p. 164.

Primary Examiner—Richard A. Wintercorn

[57] ABSTRACT

The present invention relates to a xerographic printer capable of reproducing microfilm or microfiche images over a broad enlargement range. The printer includes a light housing completely enclosed except for an aperture in the bottom wall. Microfilm or fiche images are successively presented adjacent this aperture. The walls of the housing are coated with a diffusely reflective material and cause light from a flash illumination source mounted within the housing to diffusely illuminate the surface of the image adjacent the aperture.

8 Claims, 1 Drawing Figure

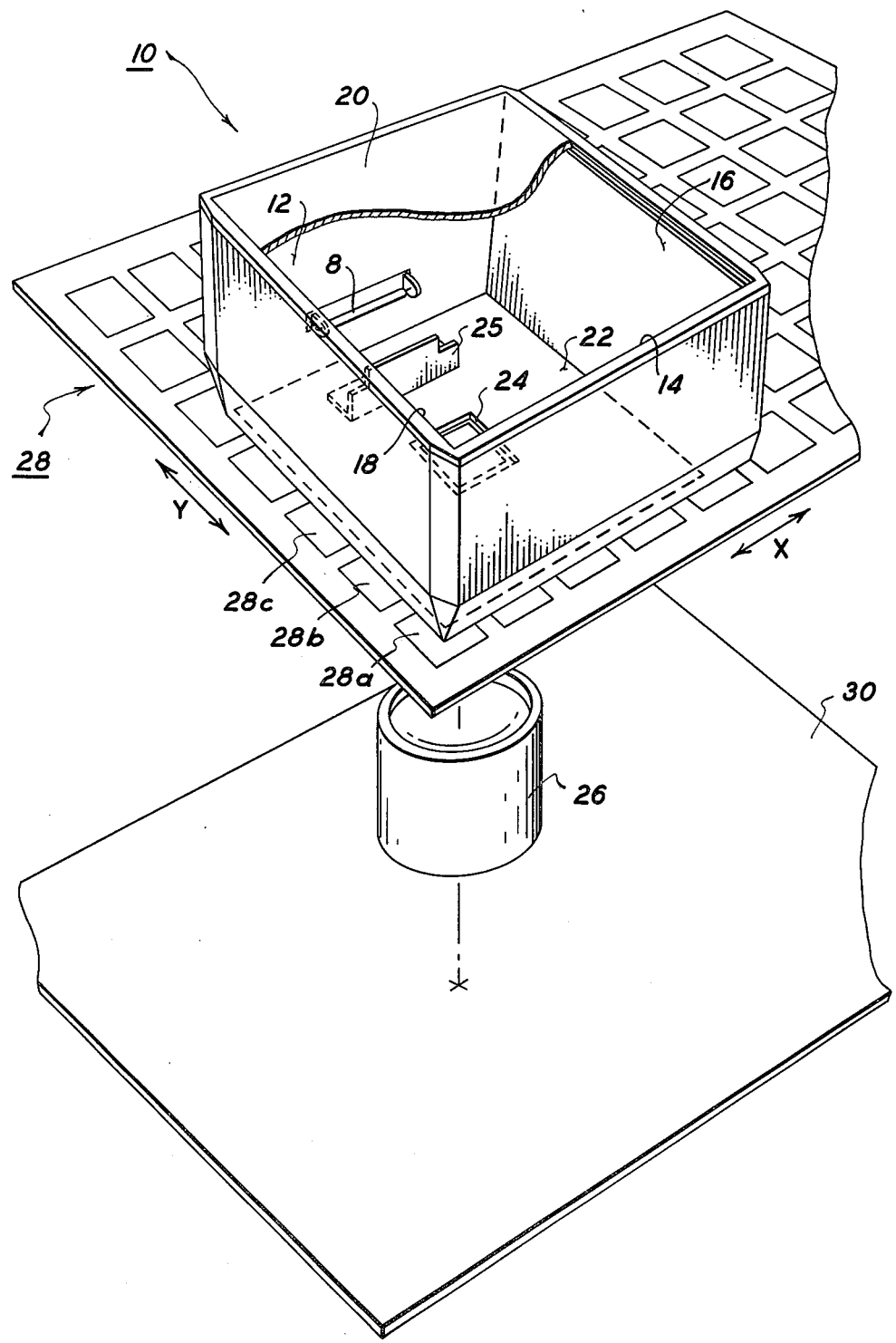

ILLUMINATION SYSTEM FOR MICROFILM PRINTER

BACKGROUND OF THE INVENTION

This invention relates generally to a microfilm printer and, more particularly, to a flash illumination projection system to be utilized in a xerographic microfilm printer. The recording of data in reduced scale on microfilm has been practiced for many years. The practice has the greatly desirable result of conserving storage space and permitting rapid retrieval and/or reproduction of the recorded material. Whether the data is recorded as microfilm images in strip form or as a group of microfilm images on a single sheet (microfiche), the images must be illuminated with a high intensity light source and projected in enlarged form upon a viewing screen and/or a photosensitive surface.

Prior art xerographic microfilm printing systems have heretofore been limited to the servo scanning type wherein a microfilm image is incrementally scanned and imaged onto a rotating drum type photoreceptor. The Xerox 970 Microfiche Printing System is one example of this type of prior art printer.

The slit scanning systems have inherent problems associated with their use in printing systems. The flyback time of the scan illumination system limits the process speed of the system. The imaging onto the photoreceptor is subject to potential distortion caused by vibrations emanating from the moving elements. And, perhaps most importantly, resolution of exposed images may begin to fall off at magnifications above 24×. It would be advantageous to utilize a flash exposure system to reduce or eliminate these problems. A flash exposure system would also result in a lower cost unit because of the less complex imaging and increased reliability. But a flash system presents other problems which must be addressed:

Marks, dirt and scratches present in or on the microimage create a light-scattering effect which causes degradation of copy image quality. An additional problem which would be present in a flash-lamp illumination system is uneven microradiance distribution of the pulsed arc. The arc exhibits pulse-to-pulse "jitter" creating a non-uniform illumination of the microimage. This non-uniform illumination is projected through the lens and creates a non-uniform exposure at the imaging plane, again adversely effecting copy quality. Another difficulty would be the requirement to utilize different projection lenses to accommodate different microimage sizes.

It is, therefore, one object of the present invention to provide a microfilm printer utilizing a flash exposure system. A further object is to incorporate a flash system which will de-emphasize the presence of scratches, dirt, etc. on the microfilm and which will provide a relatively uniform illumination of the microfilm. It is another object to provide a compact illumination system which incorporates a zoom lens to provide a wide enough range of enlargement values to accomodate present microimage sizes.

SUMMARY OF THE INVENTION

The present invention is directed to a flash illumination housing which produces a uniformly diffuse illumination of a microfilm image. In a preferred embodiment, a flash lamp is placed within a completely enclosed housing whose interior walls are coated with a diffusely reflective material. The bottom of the housing has an aperture adjacent on which the microfilm is positioned. The flash illumination undergoes multiple reflections within the housing, resulting in a substantially uniform illumination of the microfilm. The microfilm image is projected onto a photosensitive imaging plane at a desired enlargement by means of a zoom lens.

DRAWINGS

The FIGURE is a perspective view of a flash illumination system according to the invention.

DESCRIPTION

Referring now to the figure, an illumination system according to the present invention is shown. The illumination source is a flash lamp 8 which is mounted within an enclosed housing generally designated as 10. Housing 10 has a pair of opposing walls 12, 14, a second pair of opposing walls 16, 18, and a third pair of opposing walls 20, 22, lower wall 22 including an aperture 24. Wall 22 also has a blocker element 25 mounted therein for purposes to be described more fully below. Zoom lens 26 is positioned under housing 10 in optical alignment with aperture 24. Microfiche aperture card 28 is adapted to be moved along X and Y coordinates so as to bring any of the microimages 28a, b, c, etc. into alignment with aperture 24. The microimages may, of course, be inputted in other forms; e.g. 35 mm rolls.

Lamp 8 is of an arc discharge type containing in a preferred embodiment, Xenon gas. The lamp is connected to pulsing circuitry, (not shown) which when activated results in a flash of the required short duration. The interior walls of the cavity have substantially diffuse reflecting surfaces resulting from coating the interior wall surfaces with a high reflectivity (90% or greater) material. Blocker 25 may be coated with the same reflecting material.

In operation, lamp 8 is pulsed and caused to flash. Light is directed against the cavity walls and the surface of blocker 25. This light undergoes multiple reflections from all interior surfaces and produces a near-uniform diffuse illumination at the aperture 24 and, therefore, at the adjacent surface of the selected microimage on card 28. In this type of environment, the arc wander or "jitter" of lamp 8 is completely eliminated as an adverse influence. And, as a second advantage of the diffused light illumination, the presence of scratches, dirt, etc. on the microimage is de-emphasized or softened. The "scattering" effect resulting from the incidence of specular light is greatly reduced since the incident light is now impinging at angles closer to the parallel plane in which the scratches, dirt, etc. lie.

The illuminated image presented beneath aperture 24 is projected at a desired magnification by zoom lens 26, in optical alignment with the aperture, onto a flat moving photosensitive image plane 30. The projected image selectively discharges the photosensitive sheet resulting in formation of a latent electrostatic image thereon. Image plane 30 is continually moved in timed relation with the pulsing of lamp 8 and advancement of successive microfiche images to sequentially expose successive surfaces of the plane.

The purpose of blocker element 25 is to prevent direct light from lamp 8 from striking aperture 24. The blocker is, therefore, of a width and length sufficient to accomplish this purpose and consistent with the physical dimensions of the lamp. The location of the blocker could be varied: for example, the blocker could be mounted beneath the lamp, extending in an upward angle until the direct light path from light to aperture is occluded.

In one example, housing 10 consists of a cube 2" ×2" by 2". The interior of the housing is coated with a celanese polyester thermal setting paint #741-13. The dimensions of aperture 24 are 0.4" (1.016 cm) ×0.6" (1.524 cm). A Xenon lamp with an input electrical energy of 25 joules was used as the flash source (for microfiche format A7 projection at 33×). Zoom lens 26 is a Vivitar 35-85 mm f/2.8 auto Variable Focusing lens which provides a capability of projecting from microfiche formats 1 through 7. (These formats are defined in American National Standards Specification ANSI/NMR MS2-1978). Positive output copy can be obtained from negative polarity microfilm using well known reversal development techniques. The photoreceptor is of the organic type as disclosed in U.S. Pat. No. 4,115,116.

A uniform illumination at the aperture plane is achieved by some loss in system efficiency; i.e. the illumination level is greater than that required for a specular illumination system. However, housing 10 functions approximately as an integrating sphere and hence is beneficiary to the gain which is a characteristic of such a structure. Basically, the theory of the optical integrating sphere is relatively straight forward and can be explained with a simple example. First, consider a point source of radiant energy which is irradiating an elemental surface at some given distance from the source. Let the irradiation incident upon the surface be of some magnitude ($H_o$). If, without changing the intensity of the source or the distance that the elemental surface is positioned from the source, the source is now enclosed within the spherical reflector upon which the elemental surface falls, a resulting new irradiance (H) at the elemental surface is produced. This new irradiance is a function of the reflectivity of the inside surface of the sphere. If the reflectivity is a function of wavelength, the average reflectivity taken over the emissive bandwidth of the source can be used to find this new irradiance. Multiple reflections inside the sphere have now greatly increased the irradiance at the elemental surface and a gain factor, that is, the ratio of H to $H_o$, also becomes a function of the average reflectivity of the sphere. The housing 10 being an almost totally enclosed reflective cavity, conforms to the above principle.

While the Figure showed the aperture 24 approximately equal to the microimage advanced beneath, smaller images can be projected consistent with the principles of the invention. For slightly smaller images, the opaque portions surrounding each image will block unwanted light from entering the lens. For much smaller images wherein portions of adjacent images would enter within the edges of the aperture, a field stop beneath the aperture or at the imaging plane may be required.

The invention can also be practiced in the context of a microfilm printer with some design changes which can be made by those skilled in the art. The aperture 24 would be enlarged and the magnification range would not be as great.

Lamps other than a Xenon flash type may be used and other lamp mounting locations within the housing may be chosen. And while a single lamp has been shown, the techniques of the present invention are equally applicable to a multi-lamp arrangement. Although a zoom lens has been shown to be the preferred focusing and enlarging element, the invention can also be practiced by selecting the appropriate fixed focus lens for the microimage size to be reproduced.

What is claimed is:

1. An illumination system providing diffusely uniform illumination of a microfilm image comprising:
   a housing having a top and bottom surface, the bottom surface adapted to provide an aperture having dimensions at least equal to that of the microfilm image to be reproduced, said housing completely enclosed by side walls joined to said top and bottom surfaces, said housing further characterized by having its interior surfaces completely covered with a high reflectivity material, such that said surfaces are highly diffusely reflective to light incident herein,
   means to position a microimage directly beneath said aperture,
   at least one flash illumination source positioned within said housing, and
   means to energize said illumination source to produce light flashes which undergo multiple reflections from said coated surfaces to produce a uniformly diffuse illumination of said microimage.

2. Illumination system of claim 1 further comprising a blocking element positioned between the illumination source and the aperture and of sufficient length and width to prevent direct illumination from reaching any portion of the aperture.

3. Illumination system of claim 2 wherein the blocking element is coated with a high reflectivity material.

4. The illumination system of claim 1 wherein said housing has a configuration approximating a cube.

5. A microfilm printer comprising:
   a housing having a top and bottom surface, the bottom surface adapted to provide an aperture having dimensions at least equal to that of the microfilm image to be reproduced, said housing completely enclosed by side walls joined to said top and bottom surfaces, said housing further characterized by having its interior surfaces completely covered with a high reflectivity material, such that said surfaces are highly diffusely reflective to light incident thereon,
   means to position a microimage directly beneath said aperture,
   at least one flash illumination source positioned within said housing,
   means to energize said illumination source to produce light flashes which undergo multiple reflections from said coated surfaces to produce a uniformly diffuse illumination of said microimage, and
   optical means for projecting an enlarged image of said microimage positioned beneath said aperture onto a photosensitive surface.

6. The microfilm printer of claim 5 wherein said optical means is a zoom lens having a capability of projecting images at enlargements of 8X to 40X.

7. The printer of claim 5 wherein said images are microfiche images.

8. Illumination system of claim 1 further including optical means for projecting an enlarged image of said microimage onto an imaging plane.

* * * * *